United States Patent [19]
Vander Cruyssen

[11] Patent Number: 5,402,711
[45] Date of Patent: Apr. 4, 1995

[54] DEVICE AND METHOD FOR MAKING BALLS OF A KNEADABLE MATERIAL

[76] Inventor: Georges Vander Cruyssen, Kanunnik Peetersstraat 151, 2600 Berchem, Belgium

[21] Appl. No.: 26,129

[22] Filed: Mar. 4, 1993

[30] Foreign Application Priority Data

Mar. 5, 1992 [BE] Belgium ............................ 09200221
Sep. 29, 1992 [BE] Belgium ............................ 09200853

[51] Int. Cl.⁶ ............................................ A21C 11/00
[52] U.S. Cl. ............................ 99/353; 99/427; 99/440; 99/510; 425/556
[58] Field of Search ............... 99/353, 407, 510, 427, 99/440; 425/238, 241, 310, 311, 313, 444, 556; 249/67

[56] References Cited

U.S. PATENT DOCUMENTS

| | | | |
|---|---|---|---|
| 4,025,260 | 5/1977 | Neel | 425/131.1 |
| 4,187,582 | 2/1980 | DiLoreto | 17/32 |
| 4,332,538 | 6/1982 | Campbell | 425/140 |
| 5,046,940 | 9/1991 | Cummings | 425/239 |

FOREIGN PATENT DOCUMENTS

| | | |
|---|---|---|
| 502500 | 7/1979 | Australia . |
| 507668 | 12/1951 | Belgium . |
| 531136 | 8/1954 | Belgium . |
| 0133856 | 3/1985 | European Pat. Off. . |
| 549346 | 5/1974 | Switzerland . |

*Primary Examiner*—David A. Scherbel
*Assistant Examiner*—Patrick F. Brinson
*Attorney, Agent, or Firm*—Finnegan, Henderson, Farabow, Garrett & Dunner

[57] ABSTRACT

A device and a method for making balls of a kneadable material. The device comprises a tube-shaped mould piece (1) having a first (7) and a second open end (8) and a longitudinal slit (6). A supply duct (2) debouches sidewards into this mould piece (1). The device further includes a scoop member (4) which is situated on the free end of an elastic swing arm (3) and which is provided for flinging away through the second open end (8) the kneadable material which is continuously fed into the mould piece (1). This scoop member (4) scrapes hereto preferably along an inner wall of the mould piece (1) so that the elastic swing arm (3) is tensed and is abruptly released when leaving the mould piece (1).

11 Claims, 4 Drawing Sheets

DEVICE AND METHOD FOR MAKING BALLS OF A KNEADABLE MATERIAL

This invention relates to a device for making balls of a kneadable material such as meat-balls or minced meatballs, marzipan balls, spherical croquettes, etc.

Such a device is known in practice for making meatballs. This known device comprises a relatively thick perforated plate. The holes in this plate are filled with minced meat out of a funnel. Then the minced meat is pushed out of these holes in the shape of minced meat cylinders. Finally, the minced meat cylinders are rolled between two further plates into meat-balls.

A first drawback of this known device is that it is a relatively complicated and expensive device due to the large number of different components and the drive systems and controls pertaining thereto. Such a complicated device is moreover difficult to clean which has however to be done regularly in view of the required hygienic conditions.

An important drawback of this known device consists further in that the produced meat-balls are of a shape which differs usually considerably from the ideal spherical shape.

An object of the invention is now to provide a device for making balls of a kneadable material which offers a solution for the hereabove posed problems and which is in particular relatively simple and enables moreover to make balls of a more regular spherical shape.

To this end, a device according to the invention is characterized in that it comprises a mainly tube-shaped mould piece having a first and a second open end and a longitudinal slit, a supply duct for the kneadable material debouching sidewards in the mould piece and at least one scoop member provided on the free extremity of an elastic swing arm, which swing arm is coupled to drive means provided for moving the scoop member according to such a path that the swing arm passes through the slit and the scoop member through the tube-shaped mould piece from the first to the second open end in order to take along kneadable material supplied through the supply duct into this mould piece, with means being provided for tensing the elastic swing arm and for releasing it abruptly in order to remove the kneadable material from the scoop member.

For making balls of kneadable material, such as meatballs, kneadable material is injected in this device according to the invention in the mould piece until this material bulges out against an inner wall of the mould piece. The injected material is subsequently removed each time out of the mould piece in the shape of a ball by means of the scoop member without having to stop necessarily the supply of kneadable material. The device allows therefore a continuous supply of kneadable material and a continuous movement of the scoop member which considerably simplifies the required drives and controls. Moreover, it was observed that this device permits to produce balls which come close to the spherical shape.

In an effective embodiment of the device according to the invention, said drive means are provided for scraping the scoop member at least near the second open end along an inner wall of the mould piece so as to bend the swing arm elastically in order to fling the kneadable material subsequently away through said second end out of the mould piece.

In an advantageous embodiment of the device according to the invention, said drive means comprise a shaft, the swing arm is provided on in order to rotate the scoop member according to a mainly circular path, the mould piece being disposed in such a manner with respect to this shaft that upon rotation of the scoop member through the mould piece, said scrape motion is obtained. In this way, a simple construction of the drive means is obtained.

In a particular embodiment of the device according to the invention, said supply duct debouches at substantially 90° beside the longitudinal slit into the mould piece, in particular substantially at right angles to the inner wall of this mould piece. In this way, kneadable material can be squirt and bulged out against the inner wall of the mould piece without penetrating into the slit.

The invention further relates to a method for making balls of a kneadable material, in particular by means of a device according to the invention, characterized in that the kneadable material is injected sidewards into a mainly tube-shaped mould piece having a longitudinal slit, at least one scoop member provided onto an elastic swing arm is passed through the mould piece for taking along the kneadable material injected therein, and this material is removed from the scoop member by tensing the elastic arm and releasing it abruptly.

Further particularities and advanrages of the invention will become apparent from the following description of some particular embodiments of the device for making balls of kneadable material according to the invention. This description is only given by way of example and does not limit the scope of the invention. The reference numerals relate to the annexed drawings wherein.

In the different figures, the same reference numerals relate to the same or to analogous elements.

Figure 1:
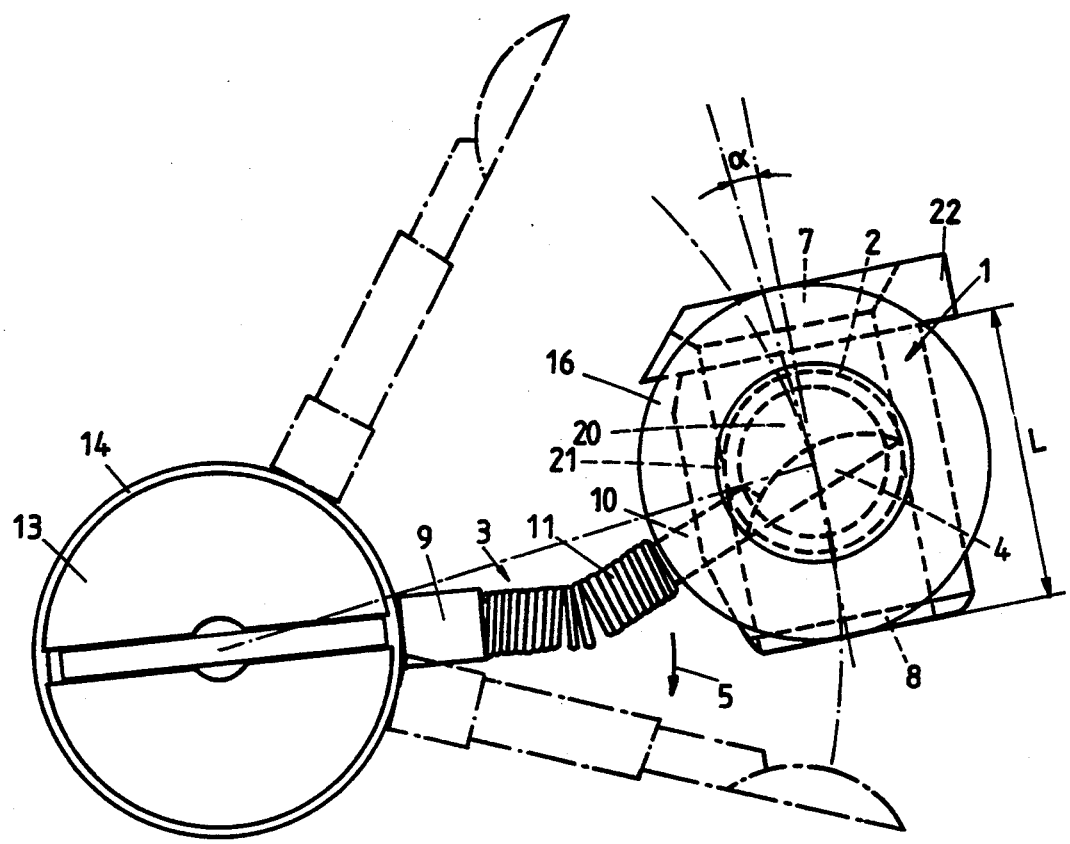
FIG. 1 represents schematically a front view of the most important components of a device according to the invention, more particularly in three different positions of the swing arm.

The device according to the invention shown in these figures is particularly suited for making balls of a kneadable material such as minced meat, marzipan, mashed potatoes, or other, possibly even non edible materials.

The device according to the invention comprises hereto a mainly tube-shaped mould piece 1, a supply duct 2 for the kneadable material which debouches sidewards into the mould piece 1 and at least one scoop member 4 applied onto the free extromity of an elastic swing arm 3. The swing arm 3 is coupled to drive means which are provided for displacing the scoop member 4 in the direction of arrow 5 through the mould piece 1 in order to remove kneadable material which is injected via the supply duct 2 into this mould piece 1 in the shape of a ball out of this mould piece 1. In order to enable this displacement, the mould piece 1 is provided with a longitudinal slit 6 extending from the first or uppermost open end 7 to the second or lowermost end 8 of the mould piece 1. The device according to the invention is further provided with means for tensing the elastic swing arm 3 and for releasing it abruptly in order to remove the ball of kneadable material from the scoop member 4.

Tensing and releasing the elastic swing arm 3 could be performed in the longitudinal direction of this arm 3 but the swing arm 3 is preferably tensed by bending it. In an effective embodiment, the scoop member 4 scrapes to this end at least near the lowermost and 8 of the mould piece 1 against the inner wall of this mould piece 1 in such a manner that the swing arm 3 is bent elastically. When the scoop member 4 leaves the mould piece 1 then through the lowermost end 8, the potential energy stored in the elastic arm 3 is suddenly released and the ball of kneadable material is flung away out of the mould piece 1.

The swing arm 3 can be composed of a simple loaf spring or can be composed, as represented in the figures, of two arm portions 9, 10 which are mutually connected by means of a spiral spring 11. This spiral spring 11 kinks when the scoop member 4 scrapes along the inner wall of the mould piece 1. The scoop member 4 has preferably the shape of a spherical spoon, the depth of which comprises in particular about one fourth of the diameter of this spoon.

Figure 2:
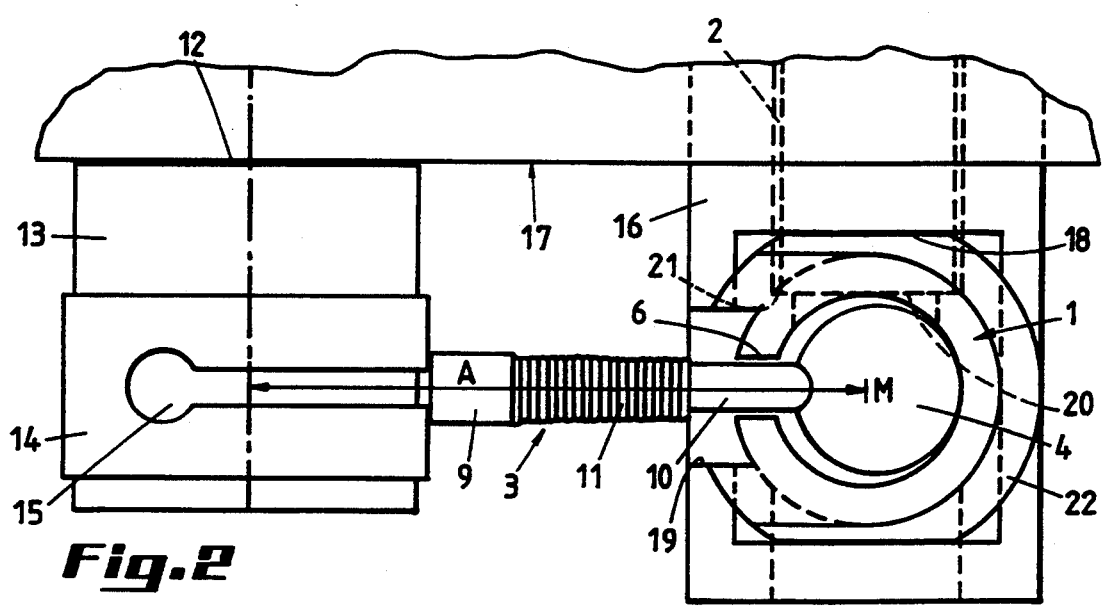
FIG. 2 represents schematically a top view of the components shown in FIG. 1.

In the embodiment according to FIGS. 1 and 2, the lowermost portion 9 of the swing arm 3 is rotatably mounted around a shaft 12 which projects out of the device through the wall 17. To this end, a cylindrical locking member 13 is applied onto this shaft 12 wherein the swing arm 3 is blocked by means of a sleeve 14 which is rotatable with respect of this member 13. By turning this sleeve 14 in such a manner that the swing arm 3 projects through the opening 15 in this sleeve 14, the swing arm 3 can be removed easily out of the locking member 13, for example for cleaning or replacing the scoop member 4.

The mould piece 1 is preferably disposed in such a manner against the wall 17 with respect to the rotation shaft 12 of the swing arm 3 that upon rotation of the scoop member 4 through the mould piece 1, this scoop member 4 scrapes substantially as from half of the length of the mould piece 1 along the inner wall of this piece. In FIG. 1, the longitudinal direction of the mould piece 1 forms to this end an angle $\alpha$ of about 7° with the tangent to the circular path of the scoop member 4 in the middle of the mould piece 1. It will be clear that in order to permit the displacement of the scoop member 4 through the mould piece 1, the diameter of the scoop member 4 has to be for example about 2 mm smaller than the inner diameter of the mould piece 1. Further, it has been found that the tube-shaped mould piece 1 has preferably a length L which comprises about half of the distance A between the rotation shaft 12 and the centre M of the mould piece 1. The distance A is for example situated between 60 and 100 mm.

In the device according to this invention it is important that the outlet of the supply duct 2 for the kneadable material is not directed towards the slit 6 in the mould piece 1, but on the contrary towards an inner wall of this mould piece 1. In this way, the kneadable material is bulged out against the inner wall of the mould piece 1 without penetrating into the slit 6. Indeed, the kneadable material is removed out of the mould piece by the scoop member 4 before it would reach the slit 6.

The supply duct 2 may possibly debouch obliquely into the mould piece 1, for example right next to the slit 6. However, as it will become apparent hereinafter, the device according to the invention can be of a simpler design when the supply duct 2 debouches, as in the figures, substantially at right angles to the mould piece at about 90° next to the longitudinal slit 6.

Figure 3:
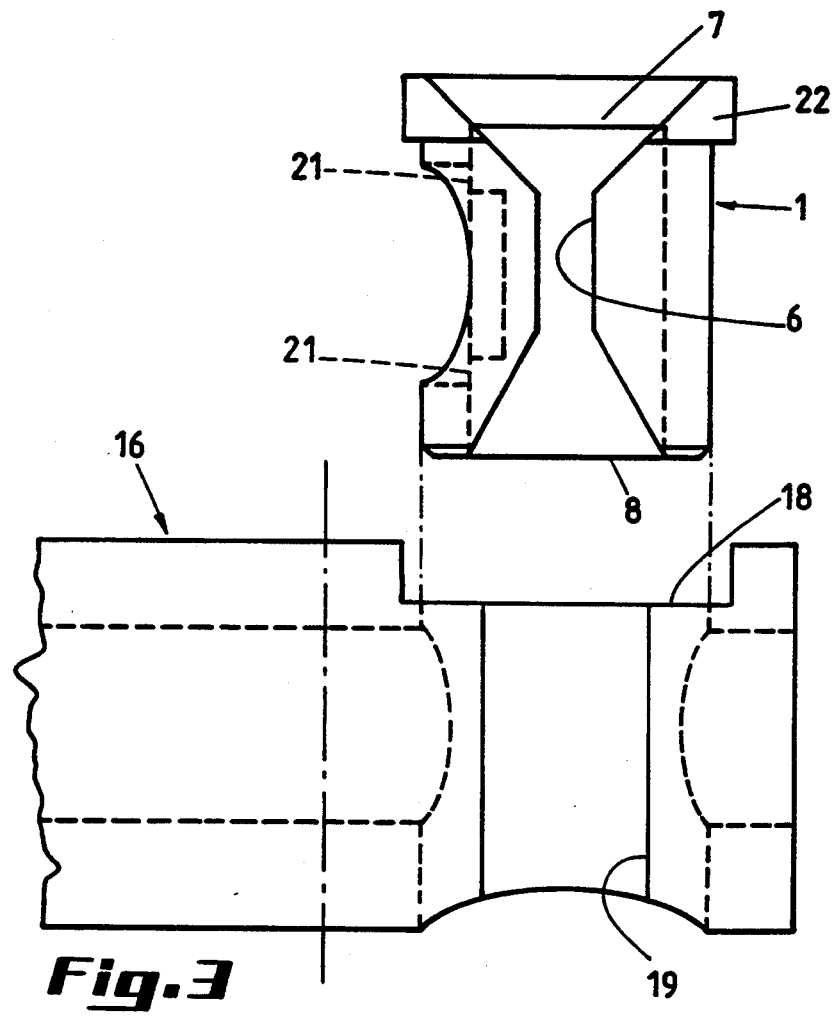
FIG. 3 represents an exploded view of the mould piece and the holder of this mould piece from the device according to the invention shown in FIGS. 1 and 2.

In order to make cleaning of the device easier, the mould piece 1 is preferably removably pressed into a holder 16. An essential feature of this holder 16 is that it leaves as well both open ends 7, 8 as the longitudinal slit 6 free for the movement of the scoop member 4. A possible embodiment of the assembly of holder 16 and mould piece 1 is shown in FIG. 3. The shown holder 16 is composed of a tube which projects at right angles out of the wall 17. At the top, there is applied a flat recess 18 into this tube. The tube has a crosswise boring drilled through this recess so that the cylindrically shaped mould piece 1 can be pushed sidewards into this tube. Furthermore, the wall of the tube is provided in the direction of the boring with a slit 19 which has to permit the movement of the swing arm 3.

The mould piece 1 is provided at the top with a projecting edge 22. With this projecting edge, it rests in the right position onto the uppermost recess 18 in the holder 16. For connecting the supply duct 2 to the mould piece 1, a sidewards inlet opening 20 is applied in this mould piece. As it appears clearly from FIG. 2, this inlet opening 20 serves also for blocking the mould piece 1 in the holder 16 by means of the supply tube 2. As a matter of fact, this supply tube 2 projects into the inlet opening 20 in the mould piece 1, more particularly up to against an edge 21 in this inlet opening 20. In the device itself, the supply tube 2 is located in the tube 16 which extends entirely through the device so that the supply tube 2 can be pulled out of the device on the other side. Since only the supply tube 2, the mould piece 1 and the scoop member 4 have to be cleaned, the device according to the invention is very easy to clean in this way.

Figure 4:
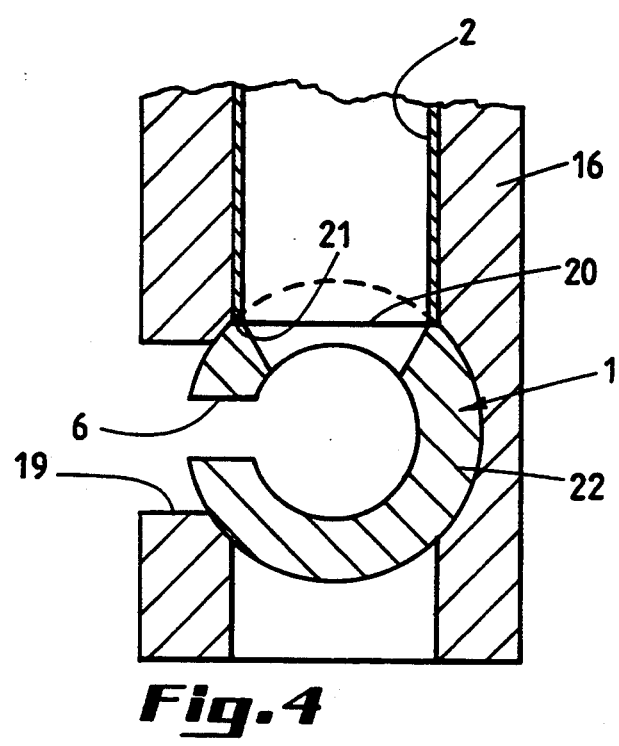
FIG. 4 represents a cross-section through a mould piece which has a smaller mould cavity and which is blocked in the holder by means of the supply duct like the mould piece from FIG. 2.

In FIG. 4, there is shown a second mould piece 1 which fits also into the holder 16 but which has a smaller mould cavity due to a larger wall thickness. Since the inlet opening 20 of this smaller mould piece 1 is, on the outside of the mould piece, as large as the inlet opening 20 of the mould piece 1 shown in FIG. 2, this smaller mould piece can also be blocked in the holder 16 by means of the same supply tube 2. Towards the mould cavity, the inlet opening 20 of the smaller mould piece narrows conically so that the size of the inlet opening at the inside of the mould piece 1 is adapted to the volume or the diameter of the mould cavity. This diameter varies for example between 15 and 30 mm. It will be clear that for each mould piece from a set of different mould pieces, a scoop member of an adapted size has to be provided.

The device according to the invention and more particularly the rotation shaft 12 can be actuated by means of an electric motor, preferably an electric motor having an adjustable rotary speed. The device comprises further means, for example a pressure vessel, for pressing the kneadable material under pressure into the supply duct 2 and preferably means for adjusting the flow rate through this supply duct 2. Use can possibly be made of an Archimedes screw having an adjustable rotary speed for supplying the kneadable material.

It will be clear that all kinds of modifications can be applied to the hereabove described embodiments without leaving the scope of the invention.

The drive mechanism can be composed for example of an endless belt or chain having one or more elastic arms with a scoop member fixed thereto. It would also be possible to fit several elastic arms 3 onto the rotation shaft 12 shown in the figures so that a same output of balls can be obtained at a lower rotary speed of the motor. This lower rotary speed results then in a smaller impact of the scoop member onto the kneadable material, unless the length of the owing arms would be increased. It was found that for minced meat and for a length A of about 80 mm good results can be obtained at a rotary speed of 120 rpm.

Figure 5:
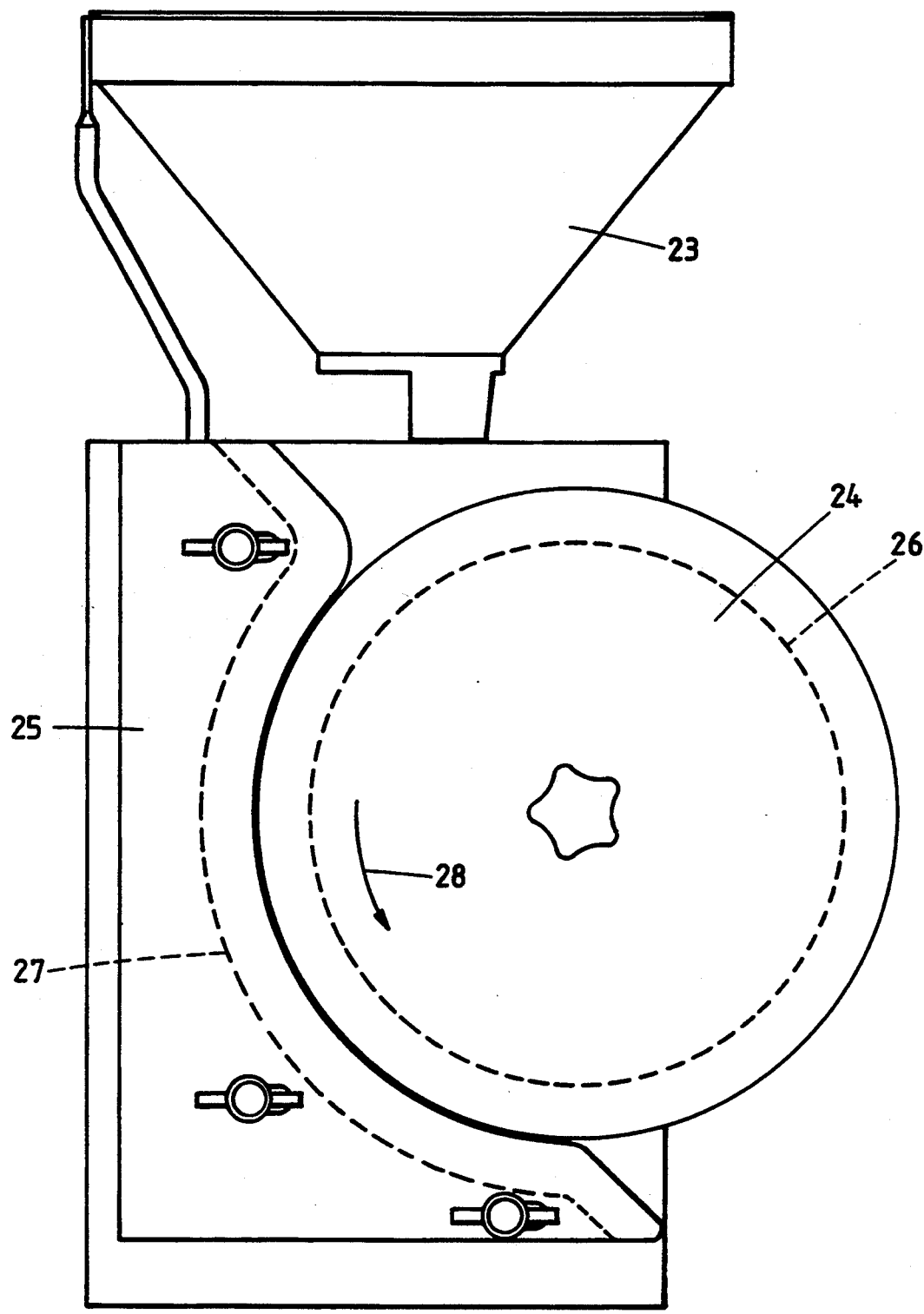
FIG. 5 represents a front view of an additional device according to the invention for further finishing the produced balls.

The balls which are swung away can possibly be caught in an additional apparatus wherein these balls are rolled into more compact balls. Such an apparatus is shown in FIG. 5. This apparatus comprises a funnel 23 for catching the balls which are flung away out of the mould piece 1. The caught balls fall then between a driven disk 24 and a fixed shoe 25 which encloses this disk 24 over a distance of about 120° to 140°. Over its periphery the disk 24 is provided with a groove 26 having a semi-circular cross-section, the diameter of which corresponds substantially to the diameter of the produced balls. Also the portion of the shoe 25 which encloses the disk 24 is provided with such a semi-circular groove 27. In this way, the disk 24 and the shoe 25 define a channel having a circular cross-section wherein the balls are rolled further to more compact balls by the rotation of the disk 24 in the direction of arrow 28. The disk 24 as well as the shoe 25 can be replaced by a further disk and a further shoe, the grooves 26 and 27 respectively of which are adapted to another ball size.

In another embodiment of the invention no use is made of the apparatus according to FIG. 5, but in this embodiment the balls which are flung away are for example caught directly into boiling water. Due to this boiling process, the balls retain their shape in the way they are flung away out of the mould piece 1.

Figure 6:
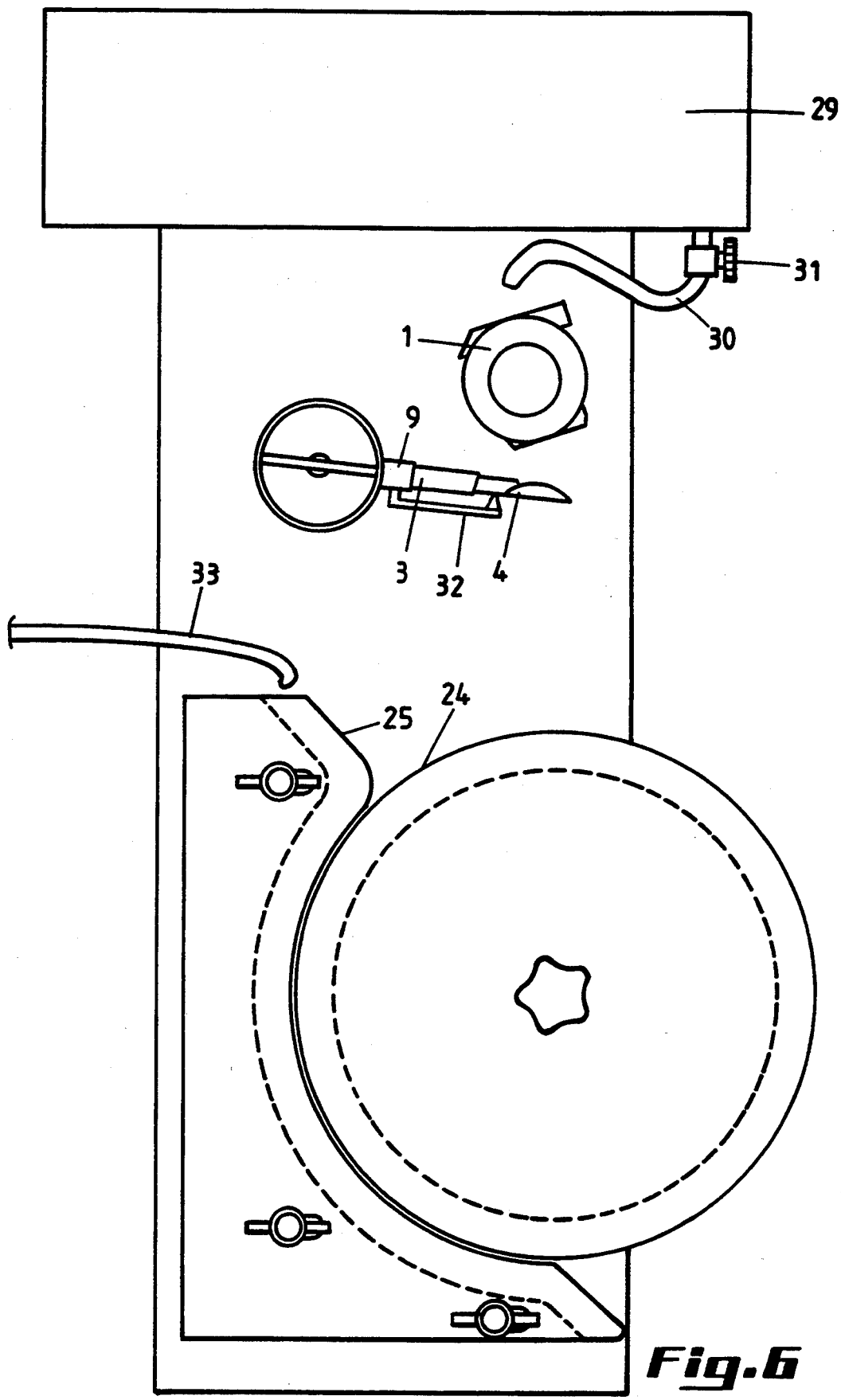
FIG. 6 represents a front view of a device according to the invention having build-in means for making balls and for further finishing these balls.

FIG. 6 shows schematically a preferred embodiment of the device according to the invention. In this embodiment, the device for making the balls and the apparatus for rolling these balls further form one unit. The swing arm 3 and the scoop member 4 are disposed in such a manner that the produced balls are flung directly into the channel between the disk 24 and the shoe 25. In this way, possible disturbances in the working of the device by balls which could stick for example possibly in the funnel 23 are avoided in an efficient way. An additional advantage of this embodiment is that only one motor is required which may drive as well the swing arm as the rotating disk 24.

In the embodiment represented in FIG. 6, the working of the device is still clearly improved by the presence of means for applying a liquid on top of the kneadable material injected into the mould piece 1 in order to prevent this material from remaining possibly stuck to the scoop member or possibly also to the disk 24 and/or to the shoe 25. As liquid use is preferably made hereto of water but depending on the material of the balls other liquids such as for example vegetable oils can be used.

To this end, a liquid reservoir 29 is provided at the top of the device according to FIG. 6. A duct 30 feeds the liquid under the influence of gravity drop by drop at the top in the mould piece 1 in such a manner that each ball receives for example 3 to 3 drops of liquid. For permitting the flow rate of the liquid to be adjusted, an adjustable valve 31 is provided in the duct 30. The larger the size of the balls, the larger is the flow rate at which the liquid is fed according to the invention.

For a skilled man it will be clear that different embodiments are possible for applying the liquid into the mould piece 1. Use can be made hereto for example of a pump which possibly sprays the liquid into the mould piece.

In another possible embodiment which is not shown in the figures, the duct 30 can also be provided for applying the liquid on the top of the disk 24, possibly through the intermediary of a brush for spreading the liquid.

In order to enhance the swing motion of the balls away from the scoop member 4, a so-called hammer 32 is fixed in FIG. 6 onto the lowermost portion 9 of the swing arm 3, which hammer is provided for abruptly stopping the resilient swing motion of the scoop member 4. In this way, the ball will in every case be released from the scoop member 4. In FIG. 6, there is applied further an air duct 33 which allows to blow air in the channel between the disk 24 and the shoe 25, more particularly in order to blow in this way the balls into this channel.

For producing balls of kneadable material by means of the device according to the invention as described hereabove and represented in the figures, the drive mechanism is started so that the scoop member passes at constant time intervals through the mould piece. Subsequently, the supply of the kneadable material through the supply duct is started. The flow rate of this kneadable material is then adjusted in such a manner that the kneadable material is squired during said time intervals each time until against the inner wall of the mould piece and budges out further to the desired size before being removed by the scoop member out of the mould piece. To this end, the rotary speed of the motor may possibly also be adjusted. An important advantage of this method is that it allows to convert a continuous supply of kneadable material by means of a simple device into discontinuous balls. Moreover, it is possible to obtain a high production speed.

What is claimed is:

1. A device for making balls of a kneadable material comprising at least one substantially tube-shaped mold piece having first and second open ends and a longitudinal slit extending between said open ends, a supply duct for supplying kneadable material to said mold piece, said duct having an outlet for debouching the kneadable material sideways into said mold piece, at least one scoop member mounted on a free end of an elastic swing arm, drive means for moving said swing arm through said longitudinal slit and said scoop member through said tube-shaped mold piece from said first to said second open end thereof to push kneadable material that has been supplied by the supply duct to said mold piece through said mold piece toward said second end thereof, said scoop member, as it is being moved by said drive means, scraping along an inner wall of said mold piece, at least near said second open end, so as to bend said swing arm elastically, whereby when said scoop member exits said mold piece and is free thereof, a ball of kneadable material will be flung away from said scoop member and out of said second open end of said mold piece by an elastic swing motion thereby generated in said swing arm, and a hammer for subsequently abruptly stopping the elastic swing motion of said arm and scoop member.

2. The device of claim 1, wherein said drive means comprises a rotatable shaft, said swing arm being mounted on said shaft so that it rotates said scoop member through a substantially circular path and said mold piece being located with respect to said shaft so that said scoop member scrapes along said inner wall of said mold piece upon rotation of said scoop member through said mold piece.

3. The device of claim 2, wherein said mold piece is located with respect to said shaft so that upon rotation of said scoop member through said mold piece, said scoop member scrapes along approximately one half of the length of the inner wall of said mold piece.

4. The device of claims 2 or 3, wherein said tube-shaped mold piece has a length approximately equal to half the distance between an axis of said shaft and an axial center of said tube-shaped mold piece.

5. A device for making balls of a kneadable material comprising at least one substantially tube-shaped mold piece having first and second open ends and a longitudinal slit extending between said open ends, a holder into which said mold piece can be removably inserted, said holder having two open ends and a longitudinal slit aligned with said open ends and slit of said mold piece, said mold piece having an inlet opening in a side thereof, a supply tube that can be removably inserted through said holder and against an edge of said inlet opening of said mold piece when said mold piece is inserted into said holder for debouching kneadable material sideways into said mold piece, said supply tube locking said mold piece in said holder, at least one scoop member mounted on a free end of an elastic swing arm, drive means for moving said swing arm through said longitudinal slit of said holder and said mold piece and said scoop member through said tube-shaped mold piece from said first to said second open ends thereof to push kneadable material that has been supplied by the supply duct to said mold piece through said mold piece toward said second end thereof, tensing means for tensing said elastic swing arm as it moves through said mold piece so that after the scoop member exits said second open end of said mold piece and is free thereof, said arm abruptly releases a ball of kneadable material from said scoop member.

6. The device of claim 5, comprising at least two interchangeable tube-shaped mold pieces that can each be inserted into said holder, said mold pieces having the same outer diameter and different wall thicknesses so that they have different internal diameters and a similar number of scoop members compatible with the internal diameters of the different mold pieces, the inlet opening on the outer side of each of said mold pieces being of the same size as said supply tube.

7. A device for making balls of a kneadable material comprising at least one substantially tube-shaped mold piece having first and second open ends and a longitudinal slit extending between said open ends, a supply duct for supplying kneadable material to said mold piece, said duct having an outlet for debouching the material sideways into said mold piece, at least one scoop member mounted on a free end of an elastic swing arm, drive means for moving said swing arm through said longitudinal slit and said scoop member through said tube-shaped mold piece from said first to said second open end thereof to push kneadable material that has been supplied by the supply duct to said mold piece through said mold piece toward said second end thereof, tensing means for tensing said elastic swing arm as it moves through said mold piece so that after the scoop member exits said second open end of said mold piece and is free thereof, said arm abruptly releases a ball of kneadable material from said scoop member, and means for catching said ball of kneadable material released by said scoop member, said catching means comprising a rotatable disk having on its outer circumference a groove of substantially semi-circular cross-section, a shoe that partially encloses said disk and has a groove of substantially the same semi-circular cross-section as said disk and located so as to form a channel of a substantially circular cross section therewith, the diameter of said channel being compatible with the diameter of the balls of kneadable material.

8. The device of claim 7, including means for applying a liquid to said mold piece.

9. A method for making balls of a kneadable material comprising the steps of injecting said kneadable material laterally into a substantially tube-shaped mold piece open at both ends and having a longitudinal slit extending between said ends, passing at least one scoop member located on a free end of an elastic swing arm through said mold piece from one end to the other by passing said arm through said slit to push said kneadable material injected therein through and toward an end of said mold piece, and flinging a ball of said kneadable material away from said scoop member by tensing said elastic arm as it passes through the mold piece and then releasing the tension abruptly immediately after it exits said mold piece.

10. The method of claim 9, wherein said elastic arm is tensed by scraping said scoop member, at least just before leaving said mold piece along an inner wall of said mold piece.

11. The method of claim 9 or 10, wherein said kneadable material is injected substantially continuously at a predetermined flow rate into said mold piece and said scoop member is passed at substantially constant time intervals through said mold piece, said flow rate and said time intervals being adjustable so that during said time interval, said kneadable material is injected against an inner wall of said mold piece and bulges out before being pushed out of said mold piece by said scoop member.

* * * * *